(12) United States Patent
Abramoski et al.

(10) Patent No.: US 9,132,797 B2
(45) Date of Patent: Sep. 15, 2015

(54) NON-SYMMETRICAL KNEE AIRBAG

(71) Applicant: FORD GLOBAL TECHNOLOGIES, LLC, Dearborn, MI (US)

(72) Inventors: Edward J. Abramoski, Canton, MI (US); Matthew B. Makowski, Northville, MI (US); Jovica J. Jakovski, Macomb Township, MI (US); Djamal E. Midoun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/065,070

(22) Filed: Oct. 28, 2013

(65) Prior Publication Data

US 2015/0115579 A1 Apr. 30, 2015

(51) Int. Cl.
*B60R 21/231* (2011.01)
*B60R 21/206* (2011.01)

(52) U.S. Cl.
CPC ............. *B60R 21/231* (2013.01); *B60R 21/206* (2013.01); *B60R 2021/23169* (2013.01)

(58) Field of Classification Search
CPC ................... B60R 21/206; B60R 2021/23169; B60R 2021/23382
See application file for complete search history.

(56) References Cited

U.S. PATENT DOCUMENTS

| 6,499,765 | B2 * | 12/2002 | Hawthorn et al. | 280/743.1 |
|---|---|---|---|---|
| 6,685,217 | B2 * | 2/2004 | Abe | 280/730.1 |
| 7,455,315 | B2 * | 11/2008 | Yokoyama | 280/730.1 |
| 7,661,700 | B2 | 2/2010 | Imamura et al. | |
| 8,272,667 | B2 * | 9/2012 | Schneider et al. | 280/730.1 |
| 8,376,396 | B2 | 2/2013 | Miller et al. | |
| 2002/0171230 | A1 * | 11/2002 | Takimoto et al. | 280/730.1 |
| 2002/0171232 | A1 * | 11/2002 | Abe | 280/730.1 |
| 2007/0090632 | A1 * | 4/2007 | Kashiwagi | 280/730.1 |
| 2011/0101660 | A1 * | 5/2011 | Schneider et al. | 280/731 |
| 2011/0175334 | A1 * | 7/2011 | Miller et al. | 280/730.2 |

FOREIGN PATENT DOCUMENTS

| DE | 10105561 A1 | 8/2002 |
|---|---|---|
| DE | 10355764 B3 | 5/2005 |
| GB | 2340458 A | 2/2000 |
| JP | 2012121572 A | 6/2012 |

OTHER PUBLICATIONS

Gehre, Christian et al; Technical University, Berlin, Germany; Paper No. 238; Protection of the Lower Extremities in Two and Three Wheelers With Safety Cell.

* cited by examiner

*Primary Examiner* — Drew Brown
(74) *Attorney, Agent, or Firm* — Frank A. MacKenzie; Brooks Kushman P.C.

(57) ABSTRACT

An exemplary knee airbag assembly may include an airbag cushion that has a first end and a second end. The airbag cushion may be inflatable from a stowed position to a deployed position in which it has a length and a thickness. The exemplary knee airbag assembly may also include an enlarged portion at at least one of the ends of the airbag cushion when the knee airbag assembly is in at least the deployed state. The enlarged portion increases the thickness of the airbag cushion along at least a portion of the length of the airbag cushion at the at least one of the ends of the airbag cushion such that the knee airbag assembly may be non-symmetrical.

12 Claims, 2 Drawing Sheets

NON-SYMMETRICAL KNEE AIRBAG

BACKGROUND

Many vehicles employ knee airbags to provide a degree of protection to the lower legs and knee regions of an occupant (e.g., the driver or a passenger) of the vehicle during a load event, such as when the vehicle collides with an object. The load event generally results in a momentum causing the occupant to move forward toward the dashboard or other component of the vehicle. When the load exceeds a certain threshold, the knee airbag may deploy and come into contact with the occupant's lower legs and/or knees to substantially prevent them from impacting the dashboard or other component of the vehicle, or to reduce the impact.

In some situations, the load event may occur off-center or at an angle to the direction of motion of the vehicle, such as when the vehicle collides with an object not substantially head-on. In such a situation, the forward movement of the vehicle and the resultant impact from the load event may cause the occupant to move laterally, such as toward a door or center console, in addition to forward. However, knee airbags generally are uniform in thickness, and therefore, do not account for this lateral movement.

Therefore, there exists a need for a knee airbag configured to limit the lateral movement in addition to the forward movement of an occupant of a vehicle during a load event.

SUMMARY

An exemplary knee airbag assembly for a vehicle may include an airbag cushion that has a first end and a second end. The airbag cushion may be inflatable from a stowed position to a deployed position in which it has a length and a thickness. The exemplary knee airbag assembly may also include an enlarged portion at at least one of the ends of the airbag cushion when the airbag cushion is in a least the deployed state. The enlarged portion may increase the thickness of the airbag cushion along at least a portion of the length of the airbag cushion at the at least one of the ends such that the knee airbag assembly may be non-symmetrical.

An exemplary vehicle may include a passenger compartment having two outboard sides defining an interior portion. The exemplary vehicle also may include a knee airbag assembly that has a first end and a second end. The first end may be adjacent to one of the outboard sides of the passenger compartment, with the second end being directed toward the interior portion of the passenger compartment. The airbag cushion may be inflatable from a stowed position to a deployed position in which it has a length and a thickness. The knee airbag assembly may also include an enlarged portion at at least one of the ends of the airbag cushion when the airbag cushion is in at least the deployed state. The enlarged portion may increase the thickness of the airbag cushion along at least a portion of the length of the airbag cushion at the at least one of the ends such that the knee airbag assembly may be non-symmetrical.

An exemplary process for manufacturing a knee airbag assembly may include first assembling an airbag cushion having a first end and a second end. The airbag cushion may be inflatable such that it has a thickness when inflated. The exemplary process may then include increasing the thickness of the airbag cushion at at least one of the ends such that the knee airbag assembly is non-symmetrical.

DETAILED DESCRIPTION

Figure 1:
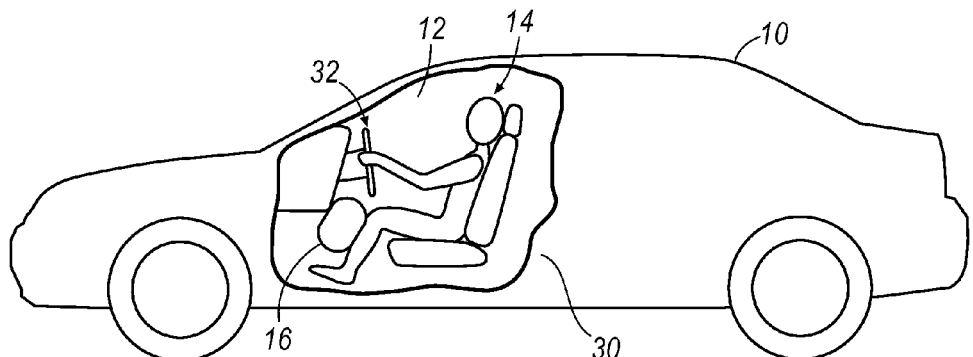
FIG. 1 is a side view of an exemplary vehicle with an exemplary knee airbag in a deployed position.

FIG. 1 illustrates an exemplary vehicle 10 having a passenger compartment 12 in which an occupant 14 may sit. The occupant 14 may be the driver, as shown in FIG. 1, or a passenger. The passenger compartment 12 may have outboard sides 30 on the driver side and the passenger side that may define an interior portion 32 of the passenger compartment 12. While the vehicle 10 is shown as a sedan or coupe in FIG. 1, it should be appreciated that it may be any vehicle, including, but not limited to, a van, a minivan, a sports utility vehicle, or the like.

The vehicle 10 may also have a knee airbag assembly 16 that may be configured to deploy from a stowed position to a deployed position during a load event in which the vehicle 10 is subjected to a load, thereby causing the occupant 14 to move forward toward the dashboard or other component of the vehicle 10 and/or the dashboard or other component to move rearward toward the occupant 14. While the knee airbag assembly 16 is shown in the driver side of the passenger compartment 12, it should be appreciated that the knee airbag assembly 16 may be in the passenger side in addition to or in lieu of the driver side. Furthermore, the knee airbag assembly 16 may also be in any subsequent rows of the passenger compartment 14.

In a load event, the knee airbag assembly 16 in the deployed position may offer a degree of protection for the lower leg and/or knee regions of the occupant 14. In some particular load events, the load may be directed such that the occupant 14 may be forced laterally, such as toward the outboard side 30 of the vehicle 10 (i.e., toward the door) or toward the interior portion 32 of the passenger compartment 12, in addition to the forward direction. The knee airbag assembly 16 may be shaped and configured to account for this direction of motion, as seen in FIGS. 2 and 4 and described in more detail hereinafter.

Figure 2:
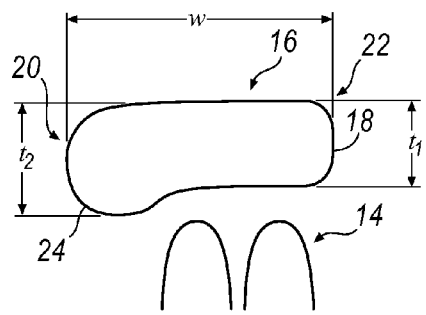
FIG. 2 is a plan view of the exemplary knee airbag of FIG. 1 according to one approach.
Figure 3A:
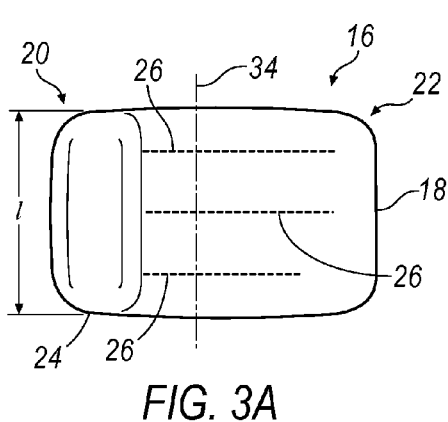
FIG. 3A is a front view of the exemplary knee airbag of FIG. 2.
Figure 3B:
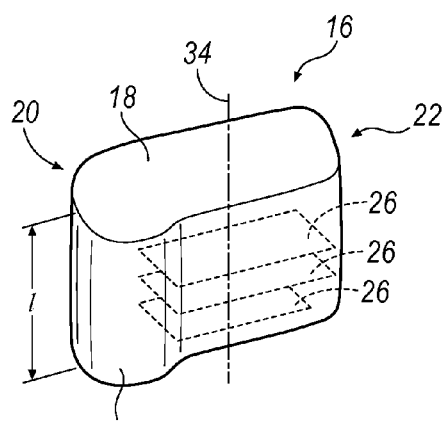
FIG. 3B is a perspective view of the exemplary knee airbag of FIG. 2.
Figure 4:
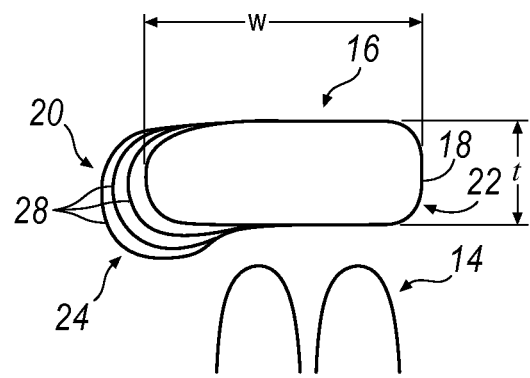
FIG. 4 is a plan view of the exemplary knee airbag of FIG. 1 according to another approach of the present disclosure.

Referring now to FIGS. 2 through 4, the knee airbag assembly 16 may include an airbag cushion 18 that may be inflatable from the stowed position to the deployed position. The airbag cushion 18 may have a first end 20 and a second end 22. One of the ends 20 or 22 may be adjacent to or closest to the outboard side 30 of the vehicle 10, with the other end 22 or 20 being directed toward the interior portion 32 of the passenger compartment 12. In the stowed position, the airbag cushion 18 may be at least partially deflated and stored in a compartment (not shown) in a component of the vehicle 10. The component may include, but is not limited to, a steering column, a dashboard, a glove compartment, and the like.

In the deployed position, the airbag cushion 18 may be defined by a width w spanning from the first end 20 to the second end 22, a first thickness $t_1$, and a length l. As an example, the first thickness $t_1$ may be 150 mm. The airbag cushion 18 may be inflated into the deployed position by a gas. The knee airbag assembly 16 also may include tethers 26 within the airbag cushion 18, as seen in FIGS. 3A and 3B. Each tether 26 may be attached, for example by sewing, to the front and rear faces of the airbag cushion 18, thereby controlling the thickness $t_1$ of the airbag cushion 18 in the deployed position. The tethers 26 may have substantially the same width (i.e., the distance from the front face to the rear face of the airbag cushion 18) such that the airbag cushion 18 may have a substantially uniform thickness along at least a portion of the width of the airbag cushion 18. The tethers 26 may be positioned such that they run in a substantially lateral direction defined to be from the first end 20 to the second end 22. While three tethers 26 are shown, it should be appreciated that there may be any number of tethers 26. Furthermore, the tethers 26 may be of the same or of differing lengths.

The knee airbag assembly 16 further may include an enlarged portion 24 at the first end 20 of the airbag cushion 18 when the airbag cushion 18 is in at least the deployed position. It should be appreciated that the enlarged portion 24 may be at the second end 22 in addition to or in lieu of the first end 20. The enlarged portion 24 may increase at least the thickness of the airbag cushion 18 in the fore and/or aft directions such that the knee airbag assembly 16 is non-symmetrical in at least the lateral direction. The enlarged portion 24 may have a thickness $t_2$ that is greater than the thickness $t_1$ of the airbag cushion 18. In one example, the increase in thickness from $t_1$ to $t_2$ may range from 1 mm to 100 mm. The enlarged portion 24 is configured to contact the lower leg and/or knee regions of the occupant 14 when the occupant 14 is moving forward and laterally, as explained above. The enlarged portion 24 may extend along the entire length of the airbag cushion 18, as seen in FIGS. 3A and 3B, or along only a portion of the length of the airbag cushion 18.

In one exemplary illustration, the enlarged portion 24 may be defined by the airbag cushion 18, as seen in FIGS. 2, 3A, and 3B. In such an approach, the at least one of the tethers 26 may be positioned within the airbag cushion 18 such that they are off-center laterally toward the second end 22 of the airbag cushion 18 (i.e., the end opposite to that of the enlarged portion 24 or where the enlarged portion 24 is not located), as illustrated by the centerline 34 in FIGS. 3A and 3B. Because the tethers 26 are not attached to the airbag cushion 18 at the first end 20 in this exemplary illustration, the thickness $t_2$ at the first end 20 is not limited, and the gas may be enabled to inflate the airbag cushion 18 more to form the enlarged portion 24. It should be appreciated that an enlarged portion 24 may be formed on both ends 20 and 22 by sizing the length of the tethers 26 such that there is a sufficient portion at the ends 20 and 22 where the tethers 26 are not attached to the airbag cushion 18.

Alternatively or in addition, the knee airbag assembly 16 may further include panels 28 affixed to at least a portion of the exterior of the airbag cushion 18 at the first end 20 (i.e., the end at which the enlarged portion 24 is located), as seen in FIG. 4. The panels 28 may have a defined thickness, and may be, but are not limited to, any type of fabric. In one approach, the panels 28 may be affixed by being sewn onto the airbag cushion 18 and/or any preceding panels 28. While three panels 28 are shown in FIG. 4, it should be appreciated that there may be any number of panels 28 necessary to achieve the desired increase in thickness, as may be dependent upon the thickness of each panel 28.

Figure 5:
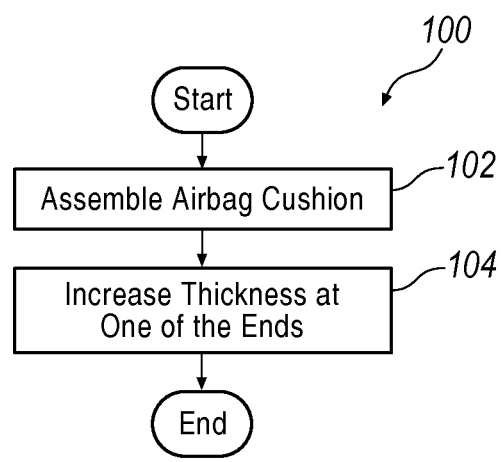
FIG. 5 is a flow diagram illustrating an exemplary process of manufacturing the exemplary knee airbag of FIG. 1.

Referring now to FIG. 5, an exemplary process 100 for manufacturing the knee airbag assembly 16 is shown. At block 102, process 100 may include assembling the airbag cushion 18. This may include inserting at least one tether 26 within the airbag cushion 18 such that it runs in a substantially lateral direction defined to be from the first end 20 of the airbag cushion 18 to the second end 22. The airbag cushion 18 may be inflatable such that it may have a thickness $t_1$ when inflated, as explained above. At block 104, process 100 may include increasing the thickness of the airbag cushion 18 at one of the ends 20 or 22. In one approach, this may include positioning the at least one tether 26 off-center laterally toward the opposite end 22 or 20 of the airbag cushion 18. Alternatively or in addition, the increasing of the thickness at the one end 20 or 22 may include affixing at least one panel 28 to at least a portion of an exterior surface of the airbag cushion 18 at that end 20 or 22. The at least one panel generally has a defined thickness. This may be done by sewing the at least one panel 28 on to the airbag cushion 18. In addition, the at least one panel 28 may span only a portion of the length of the airbag cushion 18 or the entire length, as explained above. Process 100 ends after block 104.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:
1. A vehicle airbag assembly comprising:
an airbag; and
a plurality of tethers attached to front and rear faces of the airbag and each having a width spanning less than a corresponding width between ends of the airbag such that one of the ends defines an enlarged portion beside an unattached edge of each of the tethers relative to the other of the ends upon inflation.

2. The vehicle airbag assembly of claim 1 wherein the enlarged portion is defined by the airbag cushion.

3. The vehicle airbag assembly of claim 1 wherein the enlarged portion is formed from at least one panel affixed to at least a portion of an exterior surface of the airbag cushion at the at least one of the ends, the at least one panel having a defined thickness.

4. The vehicle airbag assembly of claim 1 wherein the enlarged portion extends along the entire length of the airbag cushion at the at least one of the ends.

5. The vehicle airbag assembly of claim 1 wherein the at least one of the ends of the airbag cushion at which the enlarged portion is located corresponds to an outboard side of the vehicle.

6. The vehicle airbag assembly of claim 1 wherein the increase of the thickness of the airbag cushion due to the enlarged portion ranges from 1 mm to 100 mm.

7. A vehicle comprising:
 a passenger compartment having two outboard sides defining an interior portion; and
 a knee airbag assembly having:
  an airbag cushion having a first end and a second end, the airbag cushion being inflatable from a stowed position to a deployed position; and
  an enlarged portion at at least one of the ends of the airbag cushion, formed by a plurality of tethers attached to front and rear faces of the airbag cushion and each having a width spanning less than a corresponding width between the ends of the airbag cushion such that, when the airbag cushion is in at least the deployed position, one of the ends defines an enlarged portion beside an unattached edge of each of the tethers relative to the other of the ends.

8. The vehicle of claim 7 wherein the enlarged portion is defined by the airbag cushion.

9. The vehicle of claim 7 wherein the enlarged portion is formed from at least one panel affixed to at least a portion of an exterior surface of the airbag cushion at the at least one of the ends, the at least one panel having a defined thickness.

10. The vehicle of claim 7 wherein the enlarged portion extends along the entire length of the airbag cushion at the at least one of the ends.

11. The vehicle of claim 7 wherein the at least one of the ends of the airbag cushion at which the enlarged portion is located corresponds to one of the outboard sides of the vehicle.

12. The vehicle of claim 7 wherein the increase of the thickness of the airbag cushion due to the enlarged portion ranges from 1 mm to 100 mm.

\* \* \* \* \*